United States Patent Office 3,702,340
Patented Nov. 7, 1972

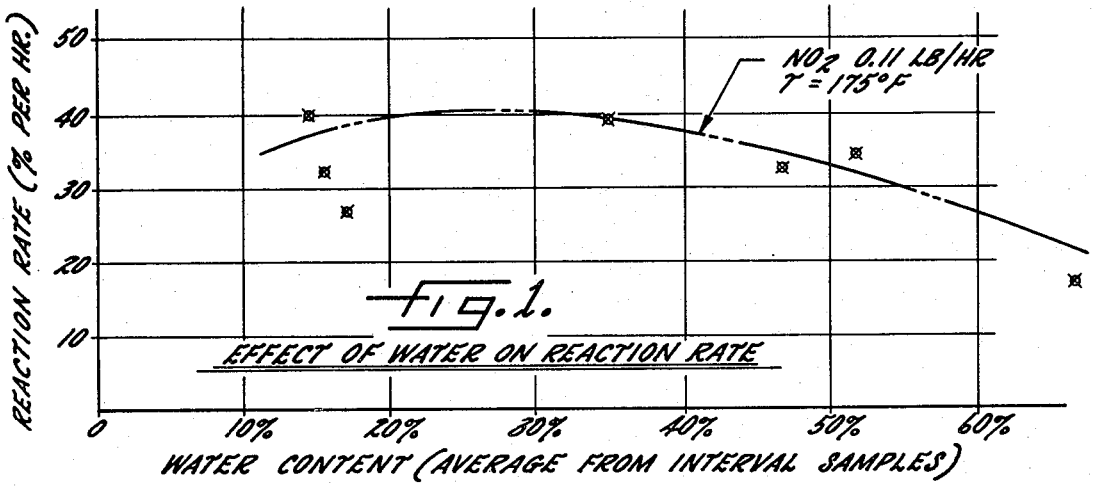
Fig. 1. EFFECT OF WATER ON REACTION RATE
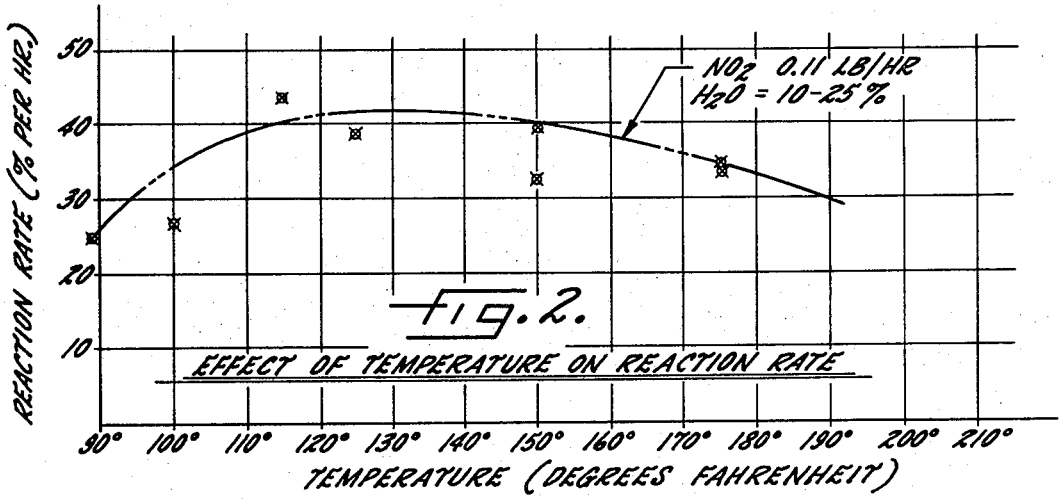
Fig. 2. EFFECT OF TEMPERATURE ON REACTION RATE
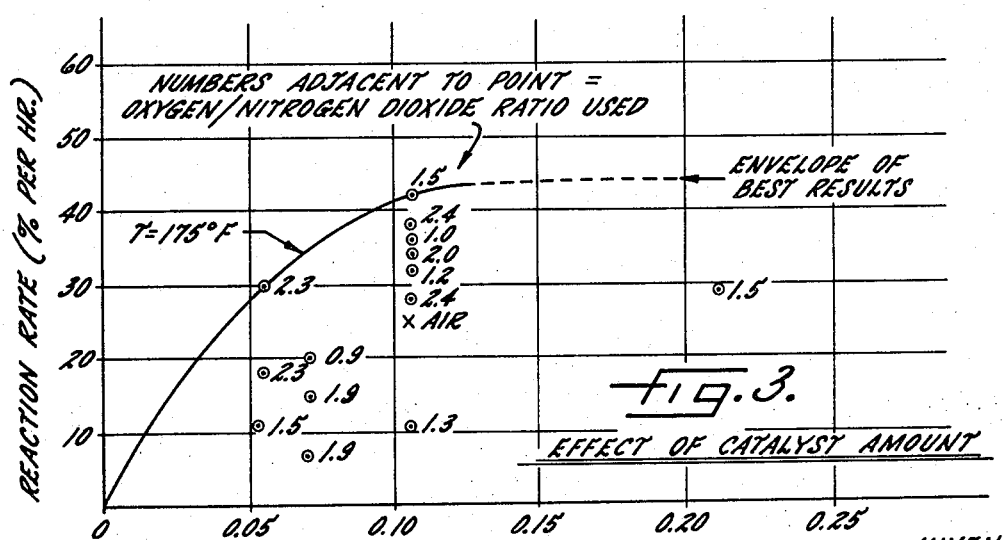
Fig. 3. EFFECT OF CATALYST AMOUNT
INVENTORS.
CLIFFORD E. SELIN, LLOYD B. LYON,
STANFORD T. HOLBROOK, FRANCIS H. HAMMOND
BY Wolfe, Hubbard, Voit & Osann
ATTORNEYS.

3,702,340
OXIDATION PROCESS EMPLOYING NITROGEN OXIDE CATALYSIS FOR THE PREPARATION OF HUMATES FROM COAL
Clifford E. Selin, Salt Lake City, Lloyd B. Lyon, Midvale, Stanford T. Holbrook, Salt Lake City, and Francis H. Hammond, Bountiful, Utah, assignors to American Hydrocarbon Company, Salt Lake City, Utah
Filed Oct. 8, 1968, Ser. No. 767,924
(Filed under Rule 47(a) and 35 U.S.C. 116)
Int. Cl. C07c 63/00
U.S. Cl. 260—515 H
14 Claims

ABSTRACT OF THE DISCLOSURE

An oxidation process employing nitrogen oxide catalysis for the preparation of humates and other organic chemicals from coal. The process comprises the steps of introducing oxygen and a catalytic amount of a nitrogen oxide into a reactor containing a pulverized coal, to which 5% to 50% moisture has been admixed, maintaining the reactor at a temperature below the boiling point of water, terminating the reaction within at least ten hours and recovering humates and other organic chemicals.

---

The present invention relates to an improved method of oxidizing coal and coal-like substances to produce useful organic chemicals, for example, the so-called humic acids. More particularly, the invention relates to an improved catalytic oxidation process whereby finely divided coal is subjected to the action of oxygen in the presence of certain nitrogen oxides to produce high yields of such chemicals at relatively low temperatures and in short periods of time.

The prior art reveals that while various oxidation processes for the preparation of humic acids from coal have been proposed, there has been almost no commercial activity along this line. The various processes described in the art have, in general, involved very high temperatures, high pressures or excessive reaction times and often all three. As such, the processes were either too inefficient or economically unfeasible to be of commercial importance. A process for the production of humic acids from coal or coal-like materials, to be economically feasible, should produce high yields of the product at relatively low temperatures, in short reaction times and, preferably, at atmospheric pressure. The present invention accomplishes these desired goals.

It is an object of the present invention to provide a process for converting coal of various ranks to useful organic chemicals and, in particular, to humic acids having utility in agriculture as a soil enrichment adjuvant and in other fields. Another object is to provide the art with an improved coal oxidation process whereby coals of various types can be converted to both acid soluble and alkali soluble products in short periods of time under relatively mild conditions.

Still further objects of the present invention are to produce humic acids and similar materials which can be combined chemically or physically with various known soil enrichment components to provide products having the properties of both fertilizer and humus adjuvant. More particularly, materials produced in accordance with the present invention may either be admixed with commercially available fertilizers or fertilizing substances or the same can be reacted with various nitrogen, phosphorus, or potassium-containing chemicals to produce highly effective soil additives. Various trace elements needed by the soil can also be chemically combined with the materials produced in accordance with the invention.

It is to processes of converting coal to useful humic acids and other organic chemicals having a wide range of applicability in agriculture and other industries that the present invention is primarily directed. It will be understood, however, that the oxidation process which is herein described has applicability to other organic materials such as peat and lignite.

The type of coal to which people have applied oxidation in an effort to obtain humic acids has varied widely. It is generally recognized, however, that the lignitic and sub-bituminous coal are the most useful sources of humic acid-like materials. It is to such coals that the present invention has particular applicability.

In accordance with the present invention, it is preferred to employ the lower rank coals, that is, from lignite through high-rank bituminous. Low rank semi-bituminous and high-rank semi-bituminous coals can also be oxidized in accordance with this process, but with greater difficulty.

The art has long recognized that the oxidation of coal generally results in a reaction product which is separable into acid-soluble and alkali-soluble fractions. The latter fraction comprises the humic acids. In the instant process a primary object has been the maximization of alkali solubles in the total oxidation product in the shortest reaction time and under the mildest possible conditions.

In accordance with the present invention, ground or powdered coals, preferably of a lower rank are mixed with an amount of water sufficient to wet the coal and preferably not more than about ten to about fifty percent by weight of the coal. Preferably the water is first mixed with the coal and the wetted coal is then placed in a reactor provided with an adequate agitation, which reactor is designed to apply heat to the coal to bring it to a temperature in range of from about 75° F. to about 175° F. Because the oxidation of coal is an exothermic reaction, the reactor must be provided with a means, preferably by indirect heat exchange, for controlling the temperature within the reactor. When the temperature of the coal within the reaction zone has been raised to the desired temperature, there is then introduced in accordance with the present invention a stream of oxygen-containing gas which can be preferably either pure oxygen or air and at least one compound selected from the group consisting of one of the following nitrogen oxides, viz, $NO$, $NO_2$, $N_2O_4$, $N_2O_3$ and $N_2O_5$. Nitrogen dioxide has been used primarily and is preferred because of its convenience and relatively low cost. It has been found that the oxidation can be catalyzed by $NO_2$ present in an amount of from about 0.01 to about 0.5 lb. $NO_2$ per pound of coal charged and preferably from about 0.1 to about 0.5 lb. $NO_2$ per pound coal charged.

The oxygen and nitrogen oxide are preferably introduced over the entire period of the reaction, which in accordance herewith is usually not more than about ten hours and preferably less. It may, of course, be carried out for longer periods but it is usually uneconomical or, indeed, detrimental to the product to do so.

The invention will be more fully understood by reference to the attached figures in which:

FIG. 1 illustrates the effect of the water content of humate product upon the reaction rate.

FIG. 2 illustrates the effect of temperature upon the reaction rate.

FIG. 3 illustrates the effect of catalyst (nitrogen oxide) concentration upon the reaction rate.

It has also been found that the rate of oxidation in this process may be enhanced by the presence of a relatively small amount of a mineral acid in the reaction zone. For example, when using nitric acid in conjunction with a catalytic amount of a nitrogen oxide, it has been found that the rate of the oxidation, as measured by the percentage of alkali soluble material produced per hour of reaction, is greater than when $NO_2$ (or equivalent) and oxygen are used without the added nitric acid. Similar, although not identical, improvement has been observed when other mineral acids are substituted for $HNO_3$. Thus, it has been found that addition of a minor amount of a mineral acid, e.g., hydrochloric, hydrofluoric or sulfuric acid have each shown the ability to increase the rate of oxidation above of what may be achieved without the added acid. Phosphoric acid ($H_3PO_4$), however, unlike the other above mentioned mineral acids has not demonstrated the same ability to increase the oxidation rate in the hereindescribed process.

In a co-pending application there is described the ability of nitric acid alone to function as the catalyst in place of a nitrogen oxide for the oxidation of coal to humic acids. To the extent that nitric acid is capable of functioning both as a catalyst and as a promoter for the reaction through its added acidity, it differs from the other mineral acids described above which serve only the latter function. The amount of acid added will vary depending upon the moisture content, the type of coal used, the amount of nitrogen oxide employed, etc. In general, however, an amount of acid sufficient to assure that the pH of the acid-treated coal in the nitrogen dioxide and oxygen oxidation system is in the range of from about 0.5 to about 4 and preferably from about 1 to about 2 is employed. In the case of concentrated hydrochloric acid, for example, it has been found that with 12.5% HCl, the rate of oxidation increased by 50%. Similar amounts of HF and $H_2SO_4$ have been found to be useful. Without any added mineral acid the pH will be somewhat higher.

It has also been found that the rate of oxidation of coal in the presence of oxygen and nitrogen oxide may also be effectively promoted by the presence of iron sulfide, either synthetic or naturally occurring. Thus, for example, synthetic or pure iron sulfide, as well as the minerals pyrite and pyrrhotite, have all been found to increase the rate of reaction. An amount of from about 2 to about 10% of the above-mentioned iron sulfides based upon the weight of coal and preferably of from about 2 to about 4% may be employed.

It has been found that the temperature at which the present process may be carried out will vary somewhat depending upon the nitrogen oxide that is employed as catalyst and upon whether there is present in the reaction zone a mineral acid or iron sulfide. However, it has been found that the temperature range over which at least about 45% of the coal charged is converted to alkali soluble product in not more than about three hours is from about 75° F. to about 175° F. and preferably from about 100° F. to about 150° F. While useful oxidation occurs up to 200° F., it has been found that the yield of the desired product falls off at the higher temperatures. The effect of temperature upon reaction rate is shown in FIG. 2.

When nitric acid or other mineral acid is added along with the nitrogen oxide and oxygen, it has been found that the temperature at which the reaction may be carried out to produce at least 45% alkali solubles in about three hours can go as low as about 90° F. Again, however, the preferred range is from about 100° F. to about 150° F. and at such temperatures a yield of alkali soluble products substantially greater than 45% can be achieved in shorter periods of time.

The useful temperature range when iron sulfide is added, is similar to that in the case where oxygen and a nitrogen oxide alone are used.

The concentration of the $NHO_3$ or other mineral acids employed in accordance herewith does not appear to be too critical. Commercial nitric acid of about 70% strength (concentrated) has been used most often with good results, but either more concentrated or substantially more dilute acid may be employed. Since the coal is wet, it will be apparent that the concentration of the acid initially employed is changed once it becomes admixed with the wet coal. The criteria appears to be that of maintaining the wetted coal in the pH range of from about 0.5 to about 4. When utilizing nitric acid, it has been found that the manner in which the nitric acid is brought into contact with the coal is very important. Thus, it has been found that it is desirable to pre-mix about 25% of the total amount of nitric acid to be added with the coal; the remaining nitric acid is then incrementally introduced throughout the reaction period, after the coal has reached the reaction temperature. It has been found that in order to achieve the relatively low temperature, rapid oxidation in accordance herewith, that it is necessary to maintain a substantial amount of moisture in the reaction zone. In general, as shown in FIG. 1, there should be present an amount of water equal to from about 5% to about 50% of the weight of the coal and preferably from about 10% to about 35%.

When operating at atmospheric pressure and temperatures approaching the boiling point of water, it is usually necessary, in order to maintain a desired moisture content in the reaction zone, to introduce additional water during the course of the reaction. This is accomplished by introducing steam or liquid water into the reaction zone.

The pressure at which the reaction occurs does not appear to be too critical. Thus, the herein-described process may be carried out at pressures either at, below or above the atmospheric pressures. However, an increased pressure does increase the rate of oxidation.

It has been found that it is not necessary to separate the alkali soluble fraction (humic acids) from the other oxidation products of the herein-described products in order to achieve soil enrichment. Therefore, the oxidation products obtained in accordance herewith may be directly admixed with soil as an enriching adjuvant without first separating the alkali-soluble fraction (humic acids) and then using this fraction as the soil enrichment adjuvant. It has been found that when beans are planted in soil containing 0.1 to 0.25% by weight of the oxidation products obtained in accordance herewith, their growth, up to first fruiting, is noticeably increased over beans grown in untreated soil. Increases in growth (as measured by weight increase) as high as 35% have been achieved. Humate material obtained in accordance with the herein-described process is also suitable for use in any of the applications of humates suggested in the prior art such as in animal feed, in oil well drilling muds, etc.

For purposes of illustrating the present invention but not of limiting the same, there are set forth below examples of the novel oxidation process herein-described. In the following examples, the amount of alkali solubles is intended to refer directly to the amount of humic acids produced in each one. In the examples, reference is made to both the initial alkali and acid solubilities of the coals and to the alkali and acid solubilities of the products resulting from the oxidation. These solubility determinations were performed as follows:

ACID SOLUBILITY

A sample of the material to be analyzed was dried. A 0.5 gram sample thereof was extracted with 100 ml. of 0.2 N acetic acid by stirring for two hours at 165° F. The insolubles were filtered off, washed, dried and weighed. The difference in weight between the original dried sample and the dried residue gives the weight of acid soluble materials.

ALKALI SOLUBILITY

A sample of the material to be analyzed was dried. A 0.5 gram sample thereof is then extracted for two hours with 100 ml. of 1 N NaOH by stirring at 175° F. The insolubles were filtered off, washed, dried and weighed. The difference in weight between the original dry sample and the dry residue gives the total weight of alkali solubles.

In all of the examples illustrated below, coal obtained from the Coalville, Utah area was first pulverized in a hammer mill and then subjected to either a rod-milling or ball-milling operation to render the same finely divided. The size of the pulverized coal is 90% below 100 mesh and when followed by a rod-milling operation was 90% below 400 mesh, and from a ball-milling operation it was 95% below 400 mesh. A typical Coalville coal is of subbituminous rank and analyzed, on an ash-free basis, 73.9% carbon, 5.3% hydrogen, 1.7% nitrogen and 18.9% oxygen when received. It has been found that this coal when pulverized and treated with a mineral acid at room temperature, e.g., phosphoric acid, will yield from 10 to 15% alkali solubles without even being subjected to the herein described oxidation process. It is believed that this is the result of releasing such acids from naturally occurring humates present in the coal. In all analyses of products of oxidation of such coal which are discussed herein, the total alkali solubility of the products has, therefore, been corrected for 14% humic acid obtained in this manner. The percentage of total alkali soluble material in the product was actually about 14% higher than is given but since it is desired, in these examples, to accurately reflect the results of the oxidation process of this invention, that 14% has been subtracted in each case. All of the coal used in the following examples contain about 8% of moisture immediately after being pulverized and before being subjected to the indicated treatment.

The percentage moisture content of the sample runs in the following examples was determined empirically by conventional chemical methods. In the examples, reference is made to the parameters "reaction rate" and "catalyst use." The "reaction rate" is defined as the rate of production of alkali solubles and is expressed in percent production per hour of reaction run. That is, reaction rate equals percent alkali solubles produced per hour. It is determined by taking the maximum value for alkali solubility prior to the point after which the alkali solubility does not increase by 5% in one-half hour of run time and dividing it by the elapsed reaction time for this run sample. This value is useful for, among other things, determining the efficiency of the reaction system. "Catalyst use" is defined as the amount of catalyst, expressed in pounds, needed to produce one pound of humic acids (alkali soluble materials). It is determined by dividing the total weight of catalyst used by the total weight of humic acids produced, and is also evaluated at the same point as is the rate. The total weight of humic acids produced is, in turn, determined by multiplying the weight of coal charged by the maximum value for the alkali solubles obtained. It is to be noted that one pound of coal charged should yield about one pound of humic acid when oxidized since the loss of water and carbon dioxide should be balanced by the uptake of oxygen and nitro groups.

EXAMPLE 1

Seven pounds of ball-milled Coalville coal were mixed with 0.4 pound of water and introduced into a water jacketed reactor fitted with both internal rotary stirring and a wall-scraping mechanism. The reactor was also designed to be rocked along its longitudinal axis when in use. Oxygen was introduced into the top of the reactor at the rate of 1.2 pounds per hour along with 0.80 pound per hour of nitrogen dioxide. No additional water was added during the reaction period. During this same reaction period, water condensed from the gaseous products was removed from the reaction and totaled 0.04 pound. The temperature in the reaction zone was maintained in the range of 74° F. to 78° F. over the 3½ hour period of reaction. Samples removed at half-hour intervals over the course of the reaction were analyzed for moisture, acid and alkali solubility. Set forth below in Table 1 are the results of such analyses:

TABLE 1

| Time (hrs.) | Percent acid sol. | Percent alkali sol. | Percent moisture |
|---|---|---|---|
| 0.0 | −0.0 | 0.0 | 10.9 |
| 0.5 | 3.9 | 9.9 | 16.9 |
| 1.0 | 2.9 | 7.2 | 17.6 |
| 1.5 | 2.9 | 36.7 | 20.6 |
| 2.0 | 6.6 | 61.2 | 24.2 |
| 2.5 | 9.0 | 67.6 | 26.1 |
| 3.0 | 8.8 | 71.9 | 22.1 |
| 3.5 | 12.4 | 73.9 | 15.1 |

In this example, the catalyst use was 0.42 lb. cat. per lb. of product produced by the end of 2.5 hours; the reaction rate was 27.1% humic acid per hour and the average moisture during the run was 19.2%.

EXAMPLE 2

Seven pounds of ball-milled Coalville coal were mixed with 0.8 pound of water and introduced into the reactor as described in Example 1. Oxygen was introduced as in Example 1 at the rate of 1.60 pounds per hour along with 1.0 pound per hour of nitrogen dioxide. No additional water was added. The water recovered from the gaseous products was 0.34 pound. The temperature in the reaction zone was maintained in the range of 148° F. to 152° F. over the three hour period of reaction. Samples were removed at half-hour intervals and were analyzed as in Example 1. Set forth below in Table 2 are the results of such analyses:

TABLE 2

| Time (hrs.) | Percent acid sol. | Percent alkali sol. | Percent moisture |
|---|---|---|---|
| 0.0 | −1.2 | 0.0 | 18.9 |
| 0.5 | 3.2 | 11.7 | 19.8 |
| 1.0 | 4.7 | 49.1 | 21.9 |
| 1.5 | 9.3 | 74.8 | 24.4 |
| 2.0 | 14.1 | 71.3 | 25.1 |
| 2.5 | 17.8 | 77.6 | 27.4 |
| 3.0 | 26.2 | 76.6 | 34.3 |

In this example, the catalyst use was 0.28 lb. cat. per lb. product, the reaction rate was 49.8% product per hour and the average moisture was 24.5%.

EXAMPLE 3

Seven pounds of rod-milled Coalville coal were mixed with 0.375 pound of water and introduced in the reactor as in Example 1. Oxygen was introduced as in Example 1 at the rate of 1.50 pounds per hour along with 0.62 pound per hour nitrogen dioxide. Into the reactor 0.20 pound of concentrated nitric acid per pound of coal charged was also introduced. Additional water was added in increments of 0.14 pound per hour by introducing steam into the bottom of the reactor. During the same period, water condensed from the gaseous products was removed and totaled 0.91 pound. The temperature in the reaction zone was maintained in the range of 171° F. to 176° F. over the two hour and fifty minute period of reaction. Samples removed at intervals over the course of reaction were analyzed as in Example 1. Set forth below in Table 3 are the results of such analyses:

TABLE 3

| Time (hrs.) | Percent acid sol. | Percent alkali sol. | Percent moisture |
|---|---|---|---|
| 0.00 | 0.8 | 0.0 | 11.8 |
| 0.83 | 2.5 | 17.0 | 9.7 |
| 1.58 | 4.7 | 50.7 | 12.4 |
| 2.33 | 10.3 | 67.0 | 14.0 |
| 2.58 | 10.7 | 68.3 | 14.6 |
| 2.82 | 10.1 | 61.8 | 15.1 |

In this example, the catalyst use was 0.46 lb. cat. per lb. (measured as total of nitric acid and $NO_2$ in $NO_2$ equivalent) product, the reaction rate was 28.7% product per hour, and the average moisture was 13.0%.

EXAMPLE 4

Seven pounds of ball-milled Coalville coal were mixed with 3.5 pounds of water and introduced into the reactor in the manner described in Example 1. The reactor, however, was a two bladed ribbon blender mixer. Oxygen was introduced as in Example 1 at the rate of 1.95 pounds per hour along with 0.80 pound per hour of nitrogen dioxide. Also into the reactor was introduced 0.05 pound of concentrated sulfuric acid per pound of coal charged. Additional water was added in increments of 0.4 pound per hour by introducing steam into the bottom of the reactor. During the same period, water condensed from the gaseous products was removed from the reaction and totaled 1.7 pounds. The temperature in the reaction zone was maintained in the range of 173° F. to 180° F. over the two hour and thirty-five minute period of reaction. Samples removed at intervals over the course of the reaction were analyzed as in Example 1. Set forth below in Table 4 are the results of such analyses:

TABLE 4

| Time (hrs.) | Percent acid sol. | Percent alkali sol. | Percent moisture |
|---|---|---|---|
| 0.00 | 5.6 | 0.0 | 59.7 |
| 0.58 | 8.1 | 19.0 | 41.7 |
| 1.08 | 9.7 | 59.4 | 45.1 |
| 1.58 | 13.1 | 71.8 | 39.4 |
| 2.08 | 17.2 | 76.5 | 42.3 |
| 2.58 | 21.2 | 74.7 | 36.2 |

In this example, the catalyst use was 0.25 lb. cat. per lb. product, the reaction rate was 45.5% product per hour and the average moisture was 44.2%.

EXAMPLE 5

Seven pounds of ball-milled Coalville coal were introduced into the reactor as in Example 4. Oxygen was introduced in the manner described in Example 1 at the rate of 1.95 pounds per hour along with 0.80 pound per hour nitrogen dioxide. In addition, 0.07 pound of iron sulfide per pound of coal charged was also introduced into the reactor. Water was added in increments of 4.5 cc. per minute by introducing steam into the bottom of the reactor. During this same period, the water condensed from the gaseous products was removed and totaled 0.6 pound. The temperature in the reaction zone was maintained in the range of 155° F. to 184° F. over the four hour and ten minute period of reaction. Samples removed at intervals over the course of the reaction were analyzed as in Example 1. Set forth in Table 5 are the results of such analyses:

TABLE 5

| Time (hrs.) | Percent acid sol. | Percent alkali sol. | Percent moisture |
|---|---|---|---|
| 0.00 | 1.5 | 0.0 | 6.7 |
| 0.83 | 6.3 | 6.3 | 12.1 |
| 1.33 | 6.3 | 46.2 | 13.4 |
| 1.83 | 8.4 | 62.3 | 11.2 |
| 2.42 | 11.8 | 69.2 | 12.2 |
| 2.83 | 16.7 | 75.8 | 14.0 |
| 3.58 | 24.7 | 78.1 | 21.1 |
| 4.17 | 24.0 | 69.9 | 21.6 |

In this example, the catalyst use was 0.43 lb. cat. per lb. product, the reaction rate was 26.6% product per hour and the average moisture was 14.1%.

EXAMPLE 6

Seven pounds of ball-milled Coalville coal were mixed with 3.5 lbs. of water and introduced into the reactor as in Example 1. Oxygen was introduced as in Example 4 at the rate of 1.95 pounds per hour along with 0.80 pound per hour of nitrogen dioxide. Also into the reactor was introduced 0.05 pound of concentrated phosphoric acid per pound of coal charged. Additional water was added in increments of 0.15 pound per hour by introducing steam into the bottom of the reactor. During the same period, water condensed from the gaseous products was removed from the reaction and this totaled 1.6 pounds. The temperature in the reaction zone was maintained in the range of 168° F.–176° F. over the two hour and forty-five minute period of reaction. Samples removed at intervals over the course of the reaction were analyzed as in Example 1. Set forth below in Table 6 are the results of such analyses:

TABLE 6

| Time (hrs.) | Percent acid sol. | Percent alkali sol. | Percent moisture |
|---|---|---|---|
| 0.00 | −1.7 | 0.0 | 38.8 |
| 0.75 | 5.4 | 0.2 | 42.0 |
| 1.25 | 5.3 | 24.7 | 42.6 |
| 1.75 | 10.2 | 61.4 | 43.2 |
| 2.25 | 14.6 | 65.8 | 44.0 |
| 2.75 | 13.7 | 50.0 | 33.9 |

In this example, the catalyst use was 0.32 lbs. cat. per lb. product, the reaction rate was 35.0% product per hour and the average moisture was 41.0%.

EXAMPLE 7

Seven pounds of finely ground Coalville coal were mixed with 1.4 pounds of water and introduced into the reactor as in Example 4. Oxygen was introduced as in Example 1 at the rate of 1.95 pounds per hour along with 0.80 pound per hour nitrogen dioxide gas. An additional amount of 0.69 pound water was added during the run. During the same period, 1.07 lbs. water was condensed from the gaseous products and removed. The temperature in the reaction zone was maintained in the range of 175° F. to 185° F. over the two hour and thirty minute period of reaction. Samples removed at intervals over the course of the reaction were analyzed as in Example 1. Set forth in Table 7 are the results of such analyses:

TABLE 7

| Time (hrs.) | Percent acid sol. | Percent alkali sol. | Percent moisture |
|---|---|---|---|
| 0.00 | 3.1 | 0.0 | 21.4 |
| 0.75 | 4.8 | 4.3 | 14.0 |
| 1.25 | 7.0 | 32.8 | 4.7 |
| 1.75 | 11.7 | 60.8 | 14.0 |
| 2.25 | 15.0 | 62.3 | 19.5 |
| 2.75 | 20.5 | 55.6 | 23.3 |

In this example, the catalyst use (1.5 hours) was 0.29 lb. cat. per lb. product; the reaction rate was 40% product per hour, and the average moisture was 16.14%.

EXAMPLE 8

Seven pounds of ball-milled Coalville coal were mixed with 0.9 lb. of concentrated hydrochloric acid and 0.75 lb. water and introduced into the reactor as in Example 1. Oxygen was introduced as in Example 1 at the rate of 2.67 lbs. per hour along with 0.95 lb. of gaseous nitrogen dioxide. Additional water was added in increments during the run, in the amount of 0.3 lb. per hour. During the run, 2.4 lbs. of water was condensed from the gaseous products and removed. The temperature in the reaction zone was maintained in the range 182° F. to 185° F. over the 2½ hours of the reaction. The amount of alkali solubles obtained after 2½ hours was 82.2%.

The calculated reaction rate is 33% product per hour and the catalyst use was 0.41 lb. cat. per lb. product.

EXAMPLE 9

Seven pounds of ball-milled Coalville coal were mixed with 0.75 lb. of water and 0.70 pound of 49% aqueous hydrofluoric acid and introduced into the reactor as in Example 1. Oxygen was introduced as in Example 1 at the rate of 2.67 pounds per hour, along with 0.95 lb. of gaseous nitrogen dioxide per hour. Additional water was added during the run in the amount of 0.8 pound. During the same period, water condensed from the gaseous products was removed from the reaction and this totaled 2.4 pounds. The temperature in the reaction zone was maintained in the range 182° F. to 186° F. over the 3 hour reaction period. After two and one-half hours of reactor run time 74.5% alkali solubles were obtained.

We claim as our invention:
1. The process of oxidizing coal which comprises:
   (a) pulverizing the coal;
   (b) admixing from about 5 to about 50% water based on the weight of the coal, with the pulverized coal;
   (c) introducing the wetted coal into a reaction zone;
   (d) maintaining said reaction zone at a temperature below the boiling point of water;
   (e) agitating the wetted coal in said reaction zone at such temperature;
   (f) introducing into said reaction zone oxygen and an amount of at least one compound selected from the group consisting of NO, $NO_2$, $N_2O_4$, $N_2O_3$ and $N_2O_5$ sufficient to afford a catalytic effect on the oxidation of the coal equivalent to introducing from about 0.01 to about 0.5 lb. $NO_2$ per lb. coal into said reaction zone;
   (g) removing the gaseous products of reaction from the reaction zone;
   (h) terminating the oxidation reaction in not more than about ten hours; and
   (i) recovering the remaining oxidation products from the reaction zone.
2. The process of claim 1 wherein the compound added is $NO_2$ present in an amount of about 0.1 to about 0.5 lb. $NO_2$ per pound coal charged.
3. The process of claim 1 wherein there is present a solid iron sulfide catalyst present in an amount of about 0.02 to about 0.10 lb. iron sulfide per lb. coal charged.
4. The process of claim 1 wherein there is present a solid iron sulfide catalyst in an amount of about 0.02 to about 0.04 lb. iron sulfide per lb. coal charged.
5. The process of claim 1 wherein water is introduced into the reaction zone during the oxidation.
6. The process of claim 1 wherein the pH of the wetted coal is substantially reduced to from about 0.5 to about 4 by addition of a mineral acid selected from the group consisting of HF, HCl, $H_2SO_4$ and $HNO_3$.
7. The process of claim 1 wherein the pH of the wetted coal is substantially reduced to from about 0.5 to about 4 by addition of a mineral acid consisting of $HNO_3$.
8. The process of claim 1 wherein the temperature in the reaction zone is maintained in the range of from about 100° F. to about 175° F.
9. The process of oxidizing coal which comprises:
   (a) pulverizing the coal;
   (b) admixing an amount of water with the pulverized coal not in excess of about 50% by weight of the coal;
   (c) introducing the wetted coal into a reaction zone;
   (d) maintaining said reaction zone at a temperature in the range of from about 75° F. to about 175° F.;
   (e) agitating the wetted coal in said reaction zone at such temperature;
   (f) introducing into said reaction zone oxygen and an amount of at least one compound selected from the group consisting of NO, $NO_2$, $N_2O_4$, $N_2O_3$, and $N_2O_5$ sufficient to afford a catalytic effect on the oxidation of the coal equivalent to introducing from about 0.01 to about 0.5 lb. $NO_2$, per lb. coal into said reaction zone;
   (h) terminating the oxidation reaction in not more than ten hours; and
   (i) recovering the remaining oxidation products from the reaction zone.
10. The process of claim 9 wherein the compound added is $NO_2$, and the reaction is terminated in less than about four hours.
11. The process of oxidizing coal which comprises agitating pulverized coal in admixture with from about 5 to about 50% by weight of water in a reaction zone, maintaining a temperature in the range of from about 50° F. to about 200° F., introducing into said reaction zone molecular oxygen and an amount of at least one compound selected from the group consisting of NO, $NO_2$, $N_2O_4$, $N_2O_3$ and $N_2O_5$ sufficient to afford a catalytic effect on the oxidation of the coal equivalent to introducing from about 0.01 to about 0.5 lb. $NO_2$ per lb. coal, terminating the reaction within ten hours and recovering humic acids.
12. The process of oxidizing coal which comprises agitating pulverized coal in admixture with from about 5 to about 50% by weight of water in a reaction zone, maintaining a temperature in the range of from about 50° F. to about 200° F., introducing into said reaction zone molecular oxygen and from about 0.01 to about 0.5 lb. $NO_2$ per lb. coal, terminating reaction within ten hours and recovering humic acids.
13. The process of claim 12 wherein the pH of the wetted coal is maintained in the range of from about 0.5 to about 4 by addition of a mineral acid selected from the group consisting of HF, HCl, $H_2SO_4$ and $HNO_3$.
14. The process of claim 13 wherein the mineral acid is $HNO_3$.

References Cited
UNITED STATES PATENTS 2,461,740   2/1949   Kiebler _____ 260—515

OTHER REFERENCES

Piret et al.: Ind. & Eng. Chem., vol. 49, No. 4 (4–57) pp. 737–741.

Kinney et al.: Ind. & Eng. Chem., vol. 48, No. 2 (2–56) pp. 327–332.

JAMES A. PATTEN, Primary Examiner

U.S. Cl. X.R.

71—24